Figure 1:
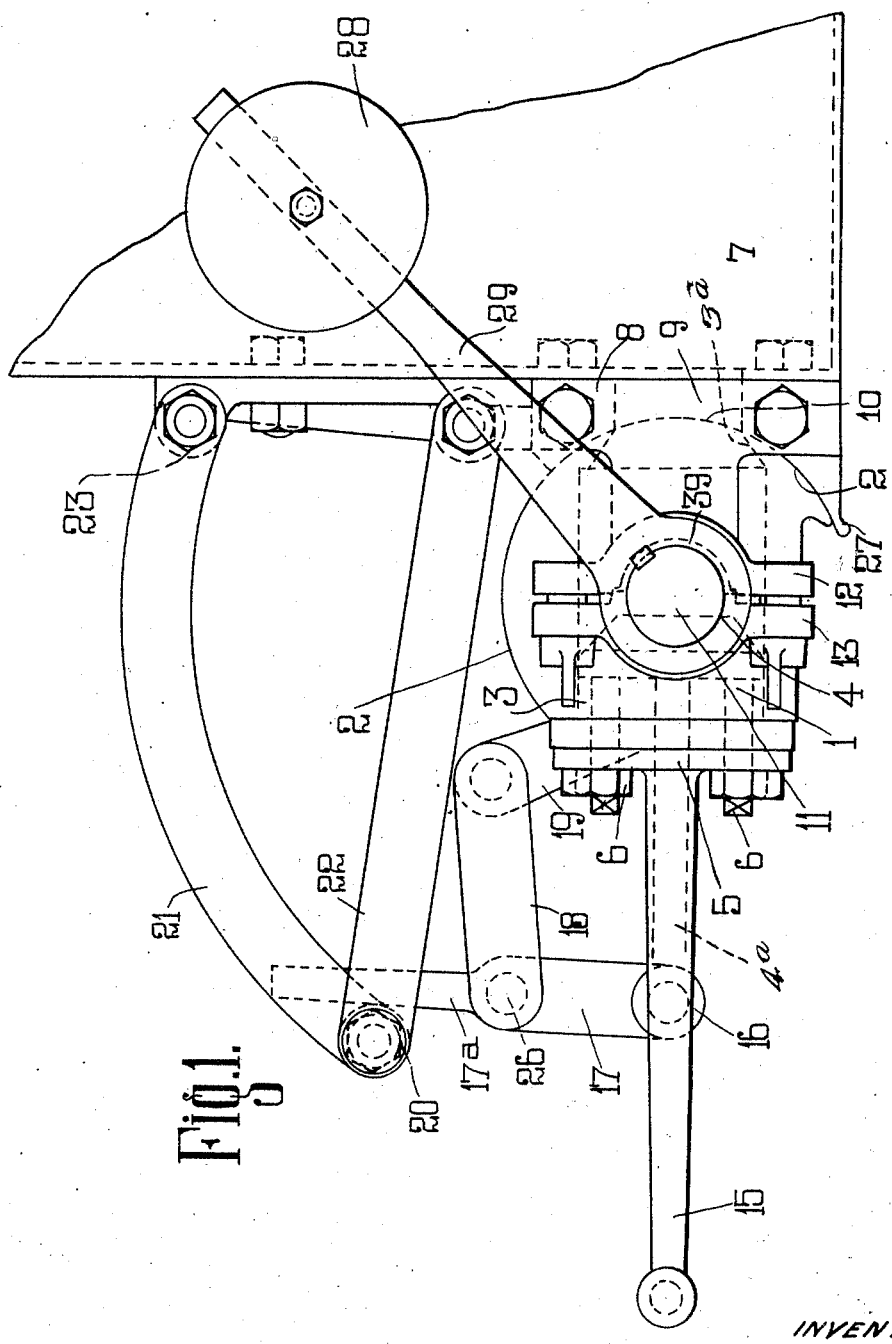

July 9, 1929.  B. M. JAGER  1,720,476
APPARATUS FOR SUPPLYING MEASURED QUANTITIES OF LIQUIDS OR SEMILIQUIDS
Filed Jan. 14, 1928   2 Sheets-Sheet 1

INVENTOR
Bertram Maurice Jager
BY
Sturtevant Mason
ATTORNEY

July 9, 1929.  B. M. JAGER  1,720,476
APPARATUS FOR SUPPLYING MEASURED QUANTITIES OF LIQUIDS OR SEMILIQUIDS
Filed Jan. 14, 1928  2 Sheets-Sheet 2

INVENTOR
Bertram Maurice Jager
BY
Sturtevant Mason
ATTORNEY

Patented July 9, 1929.

1,720,476

UNITED STATES PATENT OFFICE.

BERTRAM MAURICE JAGER, OF LIVERPOOL, ENGLAND.

APPARATUS FOR SUPPLYING MEASURED QUANTITIES OF LIQUIDS OR SEMI-LIQUIDS.

Application filed January 14, 1928, Serial No. 246,885, and in Great Britain January 14, 1927.

This invention relates to improvements in apparatus for withdrawing measured quantities of liquids or semi-liquids from tanks or other bulk storage receptacles, and discharging same into cans or other containers; and is designed more especially for viscous liquids, such as syrup, treacle, paint or like liquids or semi-liquids. My apparatus is particularly suitable for syrup and treacle, which have to be filled at the sugar refinery in exactly-measured quantities of a certain weight into cans or tins for retail sale to the public.

My invention relates to improvements in measuring apparatus of the type in which a measuring receptacle, fitted with a piston and having a wall of cylindrically curved form, is angularly displaceable in a correspondingly curved seating or casing having an opening in communication with a bulk storage receptacle, to bring it from the receiving position in which it is in communication with the bulk storage receptacle to a discharging position, or vice versa.

One of the features of my invention is to provide a measuring apparatus of the type referred to, rotatable through an angle of 90 degrees or thereabouts, in which the angular displacement of the measuring receptacle is adopted to operate the piston, the arrangement being such that lost motion is provided for in the operative mechanism of the measuring receptacle and its piston, whereby the piston is not operated until the measuring receptacle is in the receiving or discharging position.

Further features of my invention consist in providing the piston with an adjustable stop to limit the outward stroke of the piston, and thus enable the amount of material withdrawn from the supply tank to be exactly controlled, and in providing the curved seating in which the measuring receptacle moves with an edge adapted to act as a scraper for the curved surface of the measuring receptacle when it returns from its discharging position to its receiving position.

Still further objects and features of my invention are to mount the measuring receptacle on the supply tank in such a way that it can easily be dismounted for cleaning or other purposes and further to mount the measuring receptacle in trunnion bearings of such a character as to permit the friction between the curved bearing surfaces of the measuring receptacle and its seating to be easily adjusted according to the viscosity of the material being measured.

The invention will be further described with reference to the accompanying drawings, in which:—

Figure 2:
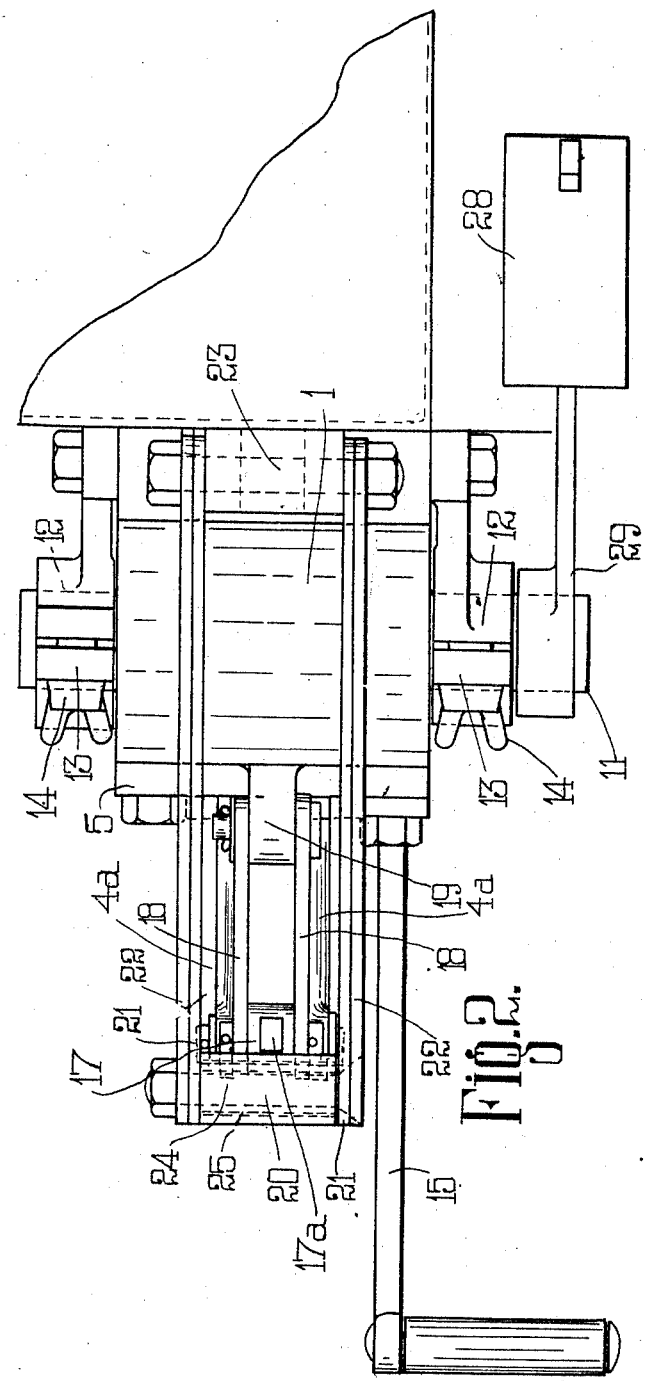

Figures 1 and 2 are respectively a side elevation and plan view of my measuring-apparatus.

Referring to the drawings, 1 denotes generally the measuring-receptacle, a portion of the wall of which is made of cylindrically-curved form as at 2, and this measuring-receptacle has a cylindrical bore 3 which forms a measuring-chamber in which works a piston 4 and so constitutes a pump. The rear end of the casing of the measuring-receptacle has a bolted-on cover 5 to close the end of the cylinder. An adjustable stop, such as an adjusting screw or screws 6, is fitted in the cylinder cover to limit the outward stroke of the piston. By this means the amount of material withdrawn can be controlled to a nicety.

On the side of the bulk storage or supply tank 7 or the like, and surrounding the outlet opening thereof, is fixed a flanged fitting 8 having an opening or passage 9 which coincides with the outlet opening in the supply tank, and this flanged fitting is made with a cylindrically-curved concave surface 10 to form a bearing for the cylindrically curved wall 2 of the measuring receptacle, the two surfaces being made a close working fit to exclude air.

The measuring-receptacle is mounted on trunnions 11, the arrangement being such that in the receiving position, when a measured quantity is being withdrawn, the tapered mouth 3ª of the measuring cylinder 3 coincides with the opening 9 in the flanged fitting 8, and the piston is moving into its outermost position. The trunnion bearings are made in two parts 12 and 13 and carried by the flanged seating, and are provided with thumbscrews 14 to adjust the friction of the curved surfaces 2 and 10 according to the viscosity of the material being measured. It will be noted that there is a space 39 left between the trunnions and the inner face of the trunnion bearing 12, and by tightening or slackening the thumbscrews 14 the measuring receptacle is moved slightly towards or away from the curved seating to adjust the friction of the said curved surfaces.

The apparatus may be arranged to be operated manually or by power. In the construction shown the apparatus is operated by hand, a crank-handle 15 attached to the measuring-receptacle 1 being provided for the purpose of effecting the angular displacement of the said receptacle through 90 degrees. The piston 4 may be operated by the angular displacement of the measuring receptacle by any suitable means. In the arrangement shown the position has two rods 4ª and the outer end of each of these piston rods is pivotally connected at 16 to a lever 17, arranged between them, which lever is in turn pivotally connected by links 18 to a projection 19 on the casing of the measuring receptacle. The lever 17 has an upper extension 17ª, which when the measuring receptacle is moved to the horizontal or receiving position contacts with a roller stop 20 carried at the outer end of a pair of bracket arms 21, 22, at each side. These bracket arms at their inner ends are secured to the flange fitting 8. A second roller stop 23 is carried by the inner end of the bracket arms 21. The two pairs of bracket arms at their outer ends are connected by a screw bolt 24 and separated by tubular distance-piece 25 thereon. When the measuring-receptacle is swung upwards through 90 degrees or thereabouts from the horizontal or receiving position to the vertical or discharge position, the extension 17ª of the lever 17 comes against the upper roller stop 23, and the lever and links assume such a position that the piston is caused to move downwards in the measuring cylinder 3 to discharge the measured quantity.

The connection between the measuring receptacle and the piston by means of the arrangement of levers and links described permits of a certain amount of lost motion, so that the movement of the measuring receptacle does not begin to operate the piston until the bore of the measuring receptacle begins to register with the supply tank outlet 9 when the receptacle is moved into the receiving position, or to clear the lower edge of the curved seating in the discharge position.

The mode of operation is as follows:—

In the receiving position shown in Figure 1, with the piston 4 in its outermost position and in contact with the adjustable stops 6, the cylinder is filled with the measured quantity of liquid. The measuring-receptacle 1 is then rotated by means of the handle 15 through an angle of 90 degrees or approximately so into its discharging position, in which the measuring-cylinder stands vertically above the can or other container into which the liquid is to be delivered, and by this angular movement the opening 9 in the flanged curved seating 8 is closed by the upper part of the curved wall of the measuring-receptacle moving over it. The piston is then move inward by the action of the lever 17 and the links 18, as already explained, to eject the contents of the measuring-cylinder 3 into the can, after which the measuring-receptacle is swung down again through 90 degrees to its initial position, and during this movement the outward stroke of the piston takes place and a fresh charge is drawn into the measuring-cylinder. During this return movement of the measuring receptacle, the sharp bottom edge 27 of the concave seating wipes off any liquid adhering to the curved face 2 of the measuring-receptacle and also forms a drip-edge. The extension 17ª on the lever 17 coming into contact with the stop 20 limits further downward movement of the measuring-receptacle.

The apparatus is provided with a counterweight 28 on a lever arm 29 fulcrumed on one of the trunnions to counterbalance the weight and facilitate the working of the apparatus.

The mounting of the measuring receptacle in the two-part trunnion bearings on the flanged seating 8 fastened to the supply tank is a very convenient construction, as it enables the measuring receptacle to be easily dismounted for cleaning or other purposes when required. It is only necessary to unscrew the thumbscrews 14, and the whole measuring receptacle and its operating mechanism can then be lifted off to give access to the bearing surfaces and the interior of the receptacle.

It is to be understood that the apparatus need not be directly fixed on the bulk storage tank, as in some cases it may be convenient for it to be used at a distance away from the tank and connected thereto by piping.

I declare that what I claim is:

1. An apparatus for withdrawing measured quantities of liquids or semi-liquids from bulk storage receptacles and discharging same into containers, comprising a curved seating having an opening therein in communication with the bulk storage receptacle, a measuring-receptacle angularly displaceable through 90 degrees or thereabouts in said curved seating to bring it from the receiving to the discharging position or vice-versa, a curved bearing surface on said measuring receptacle bearing against the curved surface of said seating, a piston in said measuring-receptacle, means for effecting the angular displacement of said measuring receptacle, and means comprising a lever linked to the piston and to the measuring-receptacle and operating with a certain amount of lost motion in such a manner that the angular displacement of the measuring-receptacle operates the piston when the measuring-receptacle is moved into the receiving or discharging positions.

2. An apparatus for withdrawing measured quantities of liquids or semi-liquids from bulk storage receptacles and discharging same into containers, comprising a curved seating having an opening therein in communication with the bulk storage receptacle, a measuring-receptacle angularly displaceable through 90 degrees or thereabouts in said curved seating to bring it from the receiving to the discharging position or vice versa, a curved bearing surface on said measuring-receptacle bearing against the curved surface of said seating, a piston in said measuring-receptacle, means for effecting the angular displacement of said measuring-receptacle, means comprising a lever and links connecting the piston to the measuring-receptacle in such a way that the angular displacement of the measuring-receptacle also operates the piston when the measuring-receptacle is moved into the receiving or discharging positions, and stop devices for limiting the movements of said lever and causing it to operate the piston when the measuring-receptacle reaches the receiving or discharging position.

3. An apparatus for withdrawing measured quantities of liquids or semi-liquids from bulk storage receptacles and discharging same into containers, comprising a cylindrically-curved seating having an opening therein in communication with the bulk storage receptacle, a measuring-receptacle angularly displaceable through 90 degrees or thereabouts in said curved seating to bring it from the receiving to the discharging position or vice-versa, a cylindrically-curved surface on said measuring-receptacle bearing against the curved surface of said curved seating, trunnions on the measuring-receptacle, trunnion-bearings carried by the said curved seating for supporting the trunnions of the measuring-receptacle, a piston in said measuring-receptacle, hand-operated means for effecting the angular displacement of the measuring-receptacle, and means for operatively connecting the piston to the measuring-receptacle in such manner that the angular displacement of the measuring-receptacle operates the piston when the measuring-receptacle is moved into the receiving or discharging positions, said means comprising piston-rods connected to the piston, a lever pivoted at one end to the piston-rods, a pair of links pivoted at one end to the said measuring-receptacle and at the other end to a point at about midlength of said lever, and stop-devices carried by bracket arms for limiting the movements of said lever and causing it to operate the said piston when the measuring-receptacle has moved into the receiving or discharging position.

4. An apparatus for withdrawing measured quantities of liquids or semi-liquids from bulk-storage receptacles and discharging same into containers, comprising a curved seating having an opening therein in communication with the bulk storage receptacle, a measuring-receptacle angularly displaceable through 90 degrees or thereabouts in said curved seating to bring it from the receiving to the discharging position or vice-versa, a curved bearing surface on said measuring-receptacle bearing against the curved surface of said seating, a piston in said measuring-receptacle, means for effecting the angular displacement of said measuring-receptacle, and means comprising a lever linked to the piston and to the measuring-receptacle and operating with a certain amount of lost motion in such a manner that the angular displacement of the measuring-receptacle operates the piston when the measuring-receptacle is moved into the receiving or discharging positions, and means on the curved seating for scraping the working face of the measuring-receptacle when the latter is returning from the discharging to the receiving position.

5. An apparatus for withdrawing measured quantities of liquids or semi-liquids from bulk storage receptacles and discharging same into containers, comprising a curved seating having an opening therein in communication with the bulk storage receptacle, a measuring-receptacle angularly displaceable through 90 degrees or thereabouts in said curved seating to bring it from the receiving to the discharging position or vice versa, a curved bearing surface on said measuring-receptacle bearing against the curved surface of said seating, a piston in said measuring-receptacle, means for effecting the angular displacement of said measuring-receptacle, and means comprising a lever linked to the piston and to the measuring-receptacle and operating with a certain amount of lost motion in such a manner that the angular displacement of the measuring-receptacle operates the piston when the measuring-receptacle is moved into the receiving or discharging positions and an edge on the lower part of said curved seating adapted to scrape the curved face of the said measuring-receptacle when the latter is returning from the discharging to the receiving position.

6. An apparatus for withdrawing measured quantities of liquids or semi-liquids from bulk-storage receptacles and discharging same into containers, comprising a curved seating having an opening therein in communication with the bulk storage receptacle, a measuring-receptacle angularly displaceable through 90 degrees or thereabouts in said curved seating to bring it from the receiving to the discharging position or vice-versa, a curved bearing surface on said measuring-receptacle bearing against the curved surface of said seating, a piston in said measuring-receptacle, means for effecting the angular displacement of said measuring-receptacle, means comprising a lever and links connecting the piston to the measuring-receptacle in such a way that the angular displacement of the measuring-receptacle also operates the piston when the measuring-receptacle is moved into the receiving or discharging positions, stop devices for limiting the movements of said lever and causing it to operate the piston when the measuring-receptacle reaches the receiving or discharging position, and an edge on the lower part of the curved seating adapted to scrape the curved face of the said measuring-receptacle when the latter is returning from the discharging to the receiving position.

7. An apparatus for withdrawing measured quantities of liquids or semi-liquids from bulk storage receptacles and discharging same into containers, comprising a cylindrically curved seating having an opening therein in communication with the bulk storage receptacle, a measuring-receptacle angularly displaceable through 90 degrees or thereabouts in said curved seating to bring it from the receiving to the discharging position or vice versa, a cylindrically-curved surface on said measuring-receptacle bearing against the curved surface of the said curved seating, a piston in said measuring-receptacle, means for effecting the angular displacement of the measuring-receptacle, means comprising a lever and links for connecting the piston to the measuring-receptacle in such a manner that the angular displacement of the measuring-receptacle operates the piston when the measuring-receptable is moved into the receiving or discharging positions, stop devices for limiting the movements of said lever and causing it to operate the piston when the measuring-receptacle reaches the receiving or discharging positions, trunnions on the measuring-receptacle, two-part trunnion-bearings carried by the said curved seating for supporting the trunnions of the measuring-receptacle, the inner part of said trunnion-bearings being fixed and the outer part made adjustable relative to said fixed part, whereby the measuring-receptacle is adjustable in position relative to the curved seating to permit the friction of the curved bearing surfaces of the measuring-receptacle on the curved seating to be adjusted according to the viscosity of the material being measured.

8. An apparatus for withdrawing measured quantities of liquids or semi-liquids from bulk storage receptacles and discharging same into containers, comprising a cylindrically curved seating having an opening therein in communication with the bulk storage receptacle, a measuring-receptacle angularly displaceable through 90 degrees or thereabouts in said curved seating to bring it from the receiving to the discharging position or vice versa, a cylindrically-curved surface on said measuring-receptacle bearing against the the curved surface of the said curved heating, a piston in said measuring-receptacle, means for effecting the angular displacement of measuring-receptacle, means comprising a lever and links for connecting the piston to the measuring-receptacle in such a manner that the angular displacement of the measuring-receptacle operates the piston when the measuring-receptacle is moved into the receiving or discharging positions, stop devices for limiting the movements of said lever and causing it to operate the piston when the measuring-receptacle reaches the receiving or discharging positions, trunnions on the measuring-receptacle, two-part trunnion-bearings carried by the said curved seating for supporting the trunnions of the measuring-receptacle, the inner part of said trunnion-bearings being fixed and the outer part made adjustable relative to said fixed part, complementary projections and recessed parts on the respective parts of the trunnion-bearings, and adjusting screws passing through the outer part of the said bearings into the fixed part for adjusting the said outer part of the bearings relative to the fixed part.

In witness whereof, I have hereunto signed my name this 30th day of December, 1927.

BERTRAM MAURICE JAGER.